Aug. 13, 1935.
H. WAYER
2,011,329
FAUCET
Filed Feb. 19, 1935
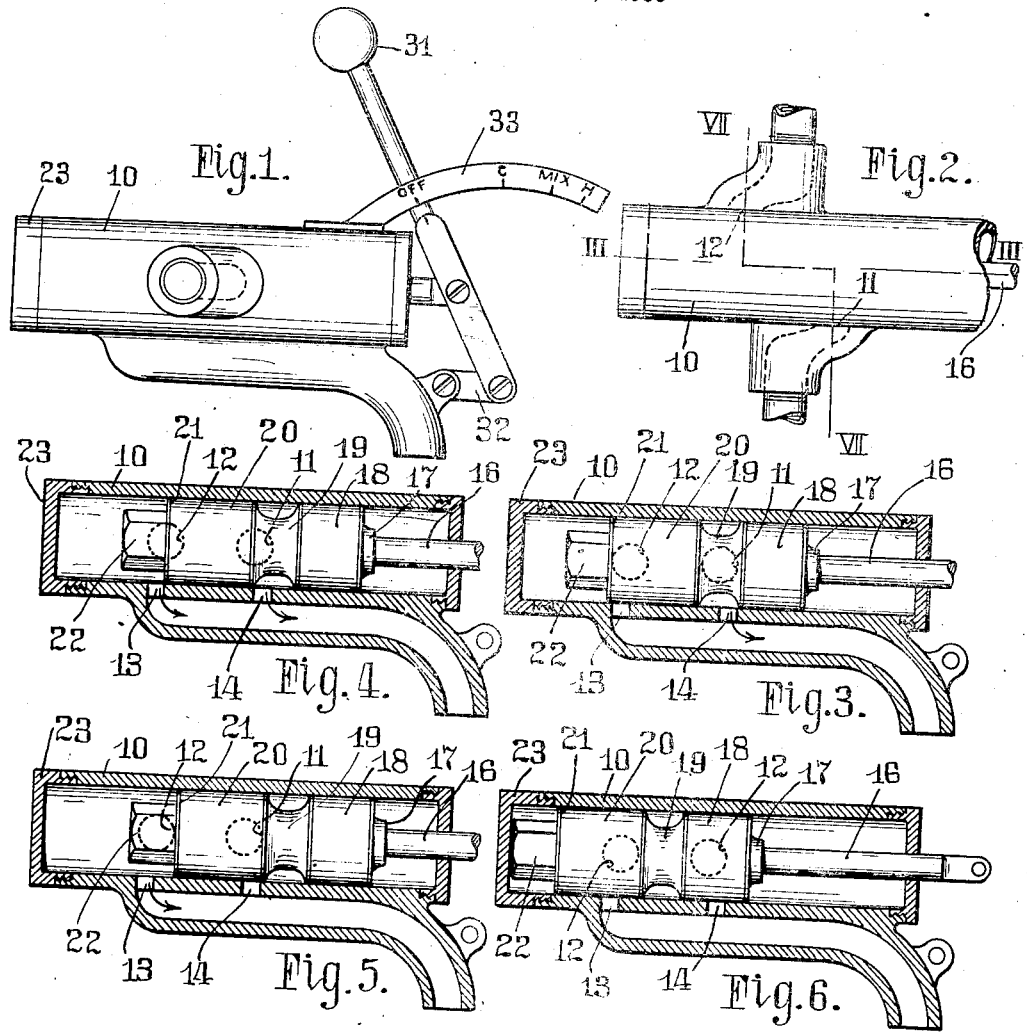
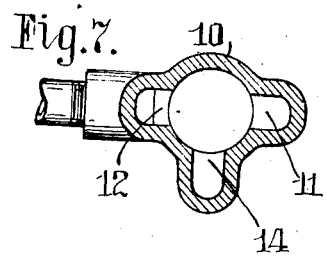
Inventor
HENRY WAYER Patented Aug. 13, 1935

2,011,329

UNITED STATES PATENT OFFICE 2,011,329

FAUCET

Henry Wayer, Columbus, Ohio

Application February 19, 1935, Serial No. 7,240

3 Claims. (Cl. 251—76)

This invention relates to faucets and especially to the type having a reciprocable sliding spigot, head or valve for opening and closing ports and passages. The invention will be particularly useful in the drawing of water, beer or other liquids where it is desired to draw them as simples or as mixtures.

An object of the invention is to provide an improved, simplified and compact construction by means of which, for example, either hot or cold water or mixed hot and cold water can be drawn at will. Incidentally there is shown herein means whereby the soft valves or port covering parts can be tightened or compressed to compensate for wear or to stop leaks, said compressing means being normally confined within the casing but rendered easily accessible for accomplishing those purposes. Other objects may be deduced from the disclosure herein.

The invention is embodied in the example of preferred construction herein particularly shown and described, the features of novelty being finally claimed.

In the accompanying drawing—

Figure 1 is a view in side elevation of a construction according to the invention.

Fig. 2 is a top plan view partly broken off of the construction shown in Fig. 1 and with the valve moving means omitted.

Fig. 3 is a vertical section on the line III—III Fig. 2 showing the valve proper in position to draw cold water.

Fig. 4 is a section like Fig. 3 showing the valve proper moved into position to draw a mixture of hot and cold water.

Fig. 5 is a section line Fig. 3 showing the valve proper in position to draw hot water.

Fig. 6 is a section like Fig. 3 showing the valve in position to shut off both waters.

Fig. 7 is a section on the line VII—VII Fig. 2 looking toward the right.

In the views the character 10 designates the valve casing, the chamber of which is of elongated cylindrical form. Said casing has at one side a cold water inlet or connection 11 and at the opposite side a hot water inlet or connection 12. Said inlets at their interior terminals are spaced apart in the chamber in respect to the length of the said cylindrical chamber.

The wall forming the lower portion of the cylindrical chamber is provided with orifices 13 and 14 shown as coinciding annularly with approximately one half the inner terminals of the inlets at ports 11 and 12 respectively, the liquid flowing through said ports and orifices when the valve is moved into position to permit discharge into spout or conductor 15 common to such orifices and inlets.

The valve proper, head or port covering means includes a stem 16 having therein a permanent head member 17 of metal, a packing or cover member 18 of leather, fabric, rubber or other suitable compressible material, a movable spool-like member 19 of metal, a second cover member 20 of material similar to that of member 18, and a metal compressor plate 21. The compressor plate 21 is backed by a nut 22 threaded on the stem adapted to be turned up on the threaded end of the stem so that both cover members can be compressed in an axial direction and thereby bulged or expanded radially at their rims to make a close or water-tight fit with the bore of the cylinder.

The said cylinder at its rear end is closed with a threaded cap 23 so that when the latter is removed access with a wrench to the compression nut 22 can be had either by the owner or a plumber to tighten up the valve and stop a leak, or, if the valve becomes difficultly workable, loosen it a little.

The ports for the cold and hot water can be on the same side and not at opposite sides of the cylinder as shown in Fig. 2 but spaced transversely of the cylinder as indicated in the illustrations Figs. 3 to 6 inclusive.

For practical application in the wash basins and bath tubs it is preferable to have the connections for cold and hot water at opposite sides of the valve case as shown in Fig. 2.

In the illustrations Figs. 3 to 6 inclusive, the cold water ports are for convenience, represented by broken circles. The operation would be the same whether said ports are at the same or at opposite sides the operation depending upon the relative position transversely of the length of the cylinder.

With the valve in the position shown in Fig. 3 cold water only is discharged; with the valve positioned as shown in Fig. 4 hot and cold water are mixed and discharged; it being observed that by a slight movement of the valve stem in one direction or the other the hot and cold waters may be varied in their proportions to each other so as to draw water of the desired temperature. The same operation will be useful in mixing other liquids, beers for example. With the valve positioned as shown in Fig. 5 hot water only is discharged and with the position of the valve as shown in Fig. 6 all of the ports are closed and the compression nut 22 in position to be turned after the cap is removed. It is, of course, convenient but not necessary to have the water cut off when the nut is to be turned.

For moving the valve the stem can be engaged with a lever having a handle 31 at one end and a link 32 at its other end connecting it to the case as shown in Fig. 1 and an arcuate arm 33 provided with indicia to aid in determining the position of the valve to be obtained by moving the handle.

What I claim is:—

1. A valve of the reciprocating piston type including a casing provided with two fluid inlet ports, and two fluid outlet ports annularly corresponding in the casing to cooperate with said inlet ports, said inlet ports spaced apart longitudinally in said casing and said outlet ports spaced apart to coincide partially only with annularly opposite areas of the respective inlet ports, a reciprocable stem in said casing having thereon two port-covering heads with a fluid channel between them, said heads adapted to be moved at will in said casing to either open or close all of said ports or to establish sole fluid communication between either of said inlet ports and its corresponding outlet port and to vary the two fluid supplies through said inlet ports and through one of said outlet ports.

2. A valve of the sliding piston type including a casing having two distinct fluid inlet ports and two distinct fluid outlets ports spaced apart longitudinally in said casing, the latter annularly alined and pairing with said inlet ports, a stem having thereon two port-closing heads spaced apart on said stem to cause at will by movement of said stem communication between either or both pairs of said annularly alined ports and the closing of all said ports.

3. A valve of the reciprocating piston type, including a casing provided with two fluid inlet ports and two fluid outlet ports, said inlet ports spaced apart longitudinally of said casing and said inlet ports also similarly spaced apart and coinciding annularly with the ports of said inlets, a reciprocable stem in said casing having thereon two covering heads with a fluid channel between them and adapted to be moved at will in said casing to either open or close all of said ports or to establish sole fluid communication between one inlet port and the port of the coinciding outlet, or to establish fluid communication between the other inlet port and its coinciding outlet port.

HENRY WAYER.